United States Patent
Bauman et al.

(10) Patent No.: US 7,822,814 B2
(45) Date of Patent: *Oct. 26, 2010

(54) DETERMINING ON DEMAND RIGHT SIZE BUFFERING WITHIN A SOCKET SERVER IMPLEMENTATION

(75) Inventors: Mark Linus Bauman, Rochester, MN (US); Bob Richard Cernohous, Rochester, MN (US); Kent L. Hofer, Lake City, MN (US); John Charles Kasperski, Rochester, MN (US); Steven John Simonson, Rochester, MN (US); Jay Robert Weeks, Cambridge, IA (US)

(73) Assignee: International Business Machines Corporation, Armonk, NY (US)

( * ) Notice: Subject to any disclaimer, the term of this patent is extended or adjusted under 35 U.S.C. 154(b) by 386 days.

This patent is subject to a terminal disclaimer.

(21) Appl. No.: 12/057,311

(22) Filed: Mar. 27, 2008

(65) Prior Publication Data

US 2008/0177973 A1 Jul. 24, 2008

Related U.S. Application Data

(63) Continuation of application No. 10/038,008, filed on Jan. 4, 2002, now Pat. No. 7,373,378, which is a continuation-in-part of application No. 09/990,850, filed on Nov. 21, 2001, now Pat. No. 7,054,925.

(51) Int. Cl.
*G06F 15/16* (2006.01)
*G06F 13/00* (2006.01)
*G06F 3/00* (2006.01)
*G06F 13/28* (2006.01)

(52) U.S. Cl. .......................... 709/204; 709/230; 710/33; 710/52; 710/56; 711/119; 711/120; 711/148; 711/171

(58) Field of Classification Search ................. 709/250; 710/33, 52, 56; 711/119, 120, 148, 171
See application file for complete search history.

(56) References Cited

U.S. PATENT DOCUMENTS

| 4,467,411 | A | | 8/1984 | Fry et al. |
|---|---|---|---|---|
| 5,592,611 | A | | 1/1997 | Midgely et al. |
| 5,764,890 | A | * | 6/1998 | Glasser et al. ................. 726/11 |
| 5,805,823 | A | | 9/1998 | Seitz |
| 5,831,666 | A | | 11/1998 | Palmer et al. |
| 5,961,606 | A | | 10/1999 | Talluri et al. |
| 5,987,517 | A | | 11/1999 | Firth et al. |

(Continued)

OTHER PUBLICATIONS

Notice of Allowance and Fee(s) Due dated Nov. 8, 2005, U.S. Appl. No. 09/990,850.

(Continued)

*Primary Examiner*—Rupal D Dharia
*Assistant Examiner*—Joe Chacko
(74) *Attorney, Agent, or Firm*—Patterson & Sheridan, LLP

(57) ABSTRACT

Method, apparatus and article of manufacture for acquiring a buffer after data from a remote sender (e.g., client) has been received by a local machine (e.g., server). Because the client data has already been received when the buffer is acquired, the buffer may be sized exactly to the size of the client data. In general, the buffer may be caller supplied or system supplied.

16 Claims, 14 Drawing Sheets

U.S. PATENT DOCUMENTS

| | | | |
|---|---|---|---|
| 5,991,829 | A | 11/1999 | Giorgio et al. |
| 6,055,576 | A * | 4/2000 | Beighe .................. 709/232 |
| 6,134,619 | A | 10/2000 | Futral et al. |
| 6,175,879 | B1 | 1/2001 | Shah et al. |
| 6,222,856 | B1 | 4/2001 | Krishnan et al. |
| 6,298,380 | B1 | 10/2001 | Coile et al. |
| 6,349,341 | B1 | 2/2002 | Likes |
| 6,377,808 | B1 | 4/2002 | Korneluk et al. |
| 6,448,978 | B1 | 9/2002 | Salvador et al. |
| 6,636,503 | B1 | 10/2003 | Shiran et al. |
| 6,654,752 | B2 | 11/2003 | Ofek |
| 6,678,735 | B1 | 1/2004 | Orton et al. |
| 6,681,327 | B1 | 1/2004 | Jardin |
| 6,697,923 | B2 | 2/2004 | Chen et al. |
| 6,717,954 | B1 | 4/2004 | Joh |
| 6,728,358 | B2 | 4/2004 | Kwan |
| 6,804,228 | B1 | 10/2004 | Schaefer |
| 6,810,462 | B2 | 10/2004 | Matsunami et al. |
| 6,822,966 | B2 * | 11/2004 | Putcha et al. .................. 370/411 |
| 6,842,800 | B2 | 1/2005 | Dupont |
| 6,853,617 | B2 | 2/2005 | Watson et al. |
| 7,007,157 | B2 | 2/2006 | Morris et al. |
| 7,054,925 | B2 | 5/2006 | Bauman et al. |
| 2002/0099838 | A1 | 7/2002 | Sebastian |
| 2003/0081601 | A1 * | 5/2003 | Morris et al. .................. 370/389 |
| 2003/0097401 | A1 | 5/2003 | Bauman et al. |
| 2003/0097459 | A1 | 5/2003 | Baskey et al. |
| 2003/0217184 | A1 * | 11/2003 | Nair .................. 709/250 |

OTHER PUBLICATIONS

Office Action dated Mar. 23, 2005, U.S. Appl. No. 10/037,595.
Final Office Action dated Sep. 7, 2005, U.S. Appl. No. 10/037,595.
Advisory Action dated Nov. 25, 2005, U.S. Appl. No. 10/037,595.
Examiner's Answer dated Aug. 1, 2006, U.S. Appl. No. 10/037,595.
Decision on Appeal dated Sep. 7, 2007, U.S. Appl. No. 10/037,595.
Office Action dated Apr. 1, 2005, U.S. Appl. No. 10/037,553.
Final Office Action dated Oct. 18, 2005, U.S. Appl. No. 10/037,553.
Advisory Action dated Jan. 26, 2006, U.S. Appl. No. 10/037,553.
Office Action dated Nov. 29, 2006, U.S. Appl. No. 10/037,553.
Notice of Allowance and Fee(s) Due dated May 24, 2007, U.S. Appl. No. 10/037,553.

* cited by examiner

DETERMINING ON DEMAND RIGHT SIZE BUFFERING WITHIN A SOCKET SERVER IMPLEMENTATION

CROSS-REFERENCE TO RELATED APPLICATIONS

This application is a continuation of U.S. patent application Ser. No. 10/038,008, filed Jan. 4, 2002 now U.S. Pat. No. 7,373,378, which is a continuation-in-part of U.S. patent application Ser. No. 09/990,850, filed Nov. 21, 2001, issued as U.S. Pat. No. 7,054,925, on May 30, 2006. Each of the aforementioned related patent applications is herein incorporated by reference in its entirety.

BACKGROUND OF THE INVENTION

1. Field of the Invention

The present invention generally relates to distributed systems. More particularly, embodiments provide client-server systems for efficient handling of client requests.

2. Description of the Related Art

Generally, a distributed computer system comprises a collection of loosely coupled machines (mainframe, workstations or personal computers) interconnected by a communication network. Through a distributed computer system, a client may access various servers to store information, print documents, access databases, acquire client/server computing or gain access to the Internet. These services often require software applications running on the client's desktop to interact with other applications that might reside on one or more remote server machines. Thus, in a client/server computing environment, one or more clients and one or more servers, along with the operating system and various interprocess communication (IPC) methods or mechanisms, form a composite that permits distributed computation, analysis and presentation.

In client/server applications, a "server" is typically a software application routine or thread that is started on a computer that, in turn, operates continuously, waiting to connect and service the requests from various clients. Thus, servers are broadly defined as computers, and/or application programs executing thereon, that provide various functional operations and data upon request. Clients are broadly defined to include computers and/or processes that issue requests for services from the server. Thus, while clients and servers may be distributed in various computers across a network, they may also reside in a single computer, with individual software applications providing client and/or server functions. Once a client has established a connection with the server, the client and server communicate using commonly-known (e.g., TCP/IP) or proprietary protocol defined and documented by the server.

In some client-server implementations sockets are used to advantage. A socket, as created via the socket application programming interface (API), is at each end of a communications connection. The socket allows a first process to communicate with a second process at the other end of the communications connection, usually on a remote machine. Each process communicates with the other process by interacting directly with the socket at its end of the communication connection. Processes open sockets in a manner analogous to opening files, receiving back a file descriptor (specifically, a socket descriptor) by which they identify a socket.

Sockets and other client-server mechanisms are shown in the server environments 100 and 200 of FIG. 1 and FIG. 2, respectively. FIG. 1 illustrates synchronous processing and FIG. 2 illustrates asynchronous processing. In general, FIG. 1 shows server environment 100 comprising a main thread 102 and a plurality of worker threads 104. An initial series of operations 106 includes creating a socket (socket ( )), binding to a known address (bind ( )) and listening for incoming connections on the socket (listen ( )). An accept operation 108 is then issued to accept a new client connection, which is then given to one of the worker threads 104. The operations for accepting a new client connection and giving the client connection to a worker thread define a loop 110 which is repeated until the server is shut down.

Upon taking the client connection from the main thread 102 the worker thread 104 issues a receive operation 112. This operation is repeated (as indicated by loop 114) until the full request is received. The request is then processed and a response is sent using a send operation 116. A loop 118 causes processing to repeat the receive operations 112, thereby handling additional requests from the current client. The worker thread 104 may then take another client connection from the main thread 104 as represented by loop 120.

Alternatively, some server platforms provide a set of asynchronous I/O functions to allow the server design to scale better to a large number of clients. While these implementations vary across platforms, most support asynchronous read and write operations, and a common wait or post completion mechanism. The server applications provide buffers to be filled or emptied of data asynchronously. The status of these asynchronous I/O operations can be checked at a common wait or can be posted back to the application via some mechanism such as a signal. This I/O model can allow a pool of threads to scale to process a much larger set of clients with a limited number of threads in the server application's thread pool.

As an illustration, consider the server environment 200 which uses asynchronous I/O consisting of one main thread 202 accepting client connections and multiple worker threads 204 processing client requests received by the main thread 202. An initial series of operations 206 are the same as those described above with reference to synchronous processing (FIG. 1). Processing of a client request begins when the main thread 202 requests a connection from a client by issuing an asynchronous accept operation 208 for a new client connection to a pending queue 209. Each asynchronous accept operation 208 results in a separate pending accept data structure being placed on the pending queue 209. Once a client connection is established, the appropriate pending accept data structure is removed from the pending queue and a completed accept data structure is placed on a completion queue 210. The completed accept data structures are dequeued by the main thread 202 which issues an asynchronous wait for which a wakeup operation is returned from the completion queue 210. An asynchronous receive operation 214 is then started on a client connection socket 217 for some number of bytes by configuring the pending queue 209 to queue the pending client requests. The number of bytes may either be determined according to a length field which describes the length of the client request or, in the case of terminating characters, for some arbitrary number. Each asynchronous receive operation 214 results in a separate pending receive data structure being placed on the pending queue 209. When a receive completes (the complete client record has been received), the appropriate pending receive data structure is removed from the pending queue 209 and a completed receive data structure is placed on the completion queue 216. An asynchronous wait 218 is issued by a worker thread 204A for which a wakeup operation 220 is returned from the queue 216 with the data.

In the case where a length field is used, the specified number of bytes from the length field is used by the worker thread 204A to issue another asynchronous receive operation 222 to obtain the rest of the client request which is typically received incrementally in portions, each of which is placed in an application buffer. The second asynchronous receive operation 222 is posted as complete to the queue 216 upon receiving the full request and the same or another thread from the thread pool 204 processes the client request. This process is then repeated for subsequent client requests. Where a terminating character(s) is used, each incoming request is dequeued from the queue 216 and checked for the terminating character(s). If the character(s) is not found, another asynchronous receive operation 222 is issued. Asynchronous receive operations are repeatedly issued until the terminating character(s) is received. This repetition for both length field and terminating character implementations is represented by loop 224 in FIG. 2.

Sockets receive data from clients using well-known "receive" semantics such as readv ( ) and recvmsg ( ). The receive semantics illustrated in FIGS. 1 and 2 are receive ( ) and asyncReceive ( ), respectively. Sockets receive semantics are either synchronous (FIG. 1) or asynchronous (FIG. 2). Synchronous APIs such as readv ( ) and recvmsg ( ) receive data in the execution context issuing the API. Asynchronous APIs such as asyncRecv ( ) return indications that the receive will be handled asynchronously if the data is not immediately available.

Synchronous receive I/O will wait until the requested data arrives. This wait is typically performed within the sockets level of the operating system. During this wait, a buffer supplied by the application server is reserved until the receive completes successfully or an error condition is encountered. Unfortunately, many client connections have a "bursty" data nature where there can be significant lag times between each client request. As a result, the buffers reserved for the incoming client requests and can typically sit idle while waiting for client requests to be received. This can cause additional storage to be allocated but not used until the data arrives, resulting in inefficient use of limited memory resources. Further, where multiple allocated buffers are underutilized, system paging rates can be adversely affected.

Asynchronous I/O registers a buffer to be filled asynchronously when the data arrives. This buffer cannot be used until the I/O completes or an error condition causes the operation to fail. When data arrives, the buffer is filled asynchronously relative to the server process a completed request transitions to a common wait point for processing. While advantageous, this asynchronous behavior suffers from the same shortcomings as the synchronous receive I/O into the buffer supplied is reserved until the operation completes and an indication is returned to the application server. As a result, the storage and paging concerns described above with respect to synchronous receive I/O also applied to asynchronous I/O processing.

In summary, synchronous and asynchronous I/O suffer from at least two problems. First, the multiple buffers reserved at any given time are more than what are needed to service the number of incoming requests. As a result, the memory footprint for processing is much larger than needed. Second, memory allocated for each incoming requests will consume this valuable resource and cause memory management page thrashing.

To avoid the foregoing problems, it is desirable to acquire a buffer large enough to hold all of the data when it arrives. Such an approach would keep the buffer highly utilized from a memory management paging perspective. However, one problem with this approach is determining what size buffer an application server should provide when the I/O operation is initiated. This problem arises because the record length is contained within the input data stream and will only be known when the data arrives. One solution would be to code the application server for the worst possible case and always supply a buffer large enough to accommodate the largest record possible. However, this would be a waste of resources and could adversely affect the paging rates not only for the server, but the system itself.

Therefore, a need exists for efficiently allocating buffers for client requests.

SUMMARY OF THE INVENTION

The present invention generally provides embodiments for acquiring a buffer only once client data has been received. Because the client data has already been received when the buffer is acquired, the buffer may be sized exactly to the size of the client data, thereby making efficient use of storage.

One embodiment provides a method of processing client-server messages, comprising receiving, at a sockets layer of a computer, data from a remote source via a network connection prior to allocating a buffer to contain the data; and subsequently allocating the buffer to contain the data.

Another embodiment provides computer readable medium containing a program which, when executed by a computer, performs operations for processing client-server messages, the operations comprising: processing an input operation issued from a sockets server application to a sockets layer of the computer, wherein the input operation is configured with a buffer mode parameter indicating to the sockets layer a buffer acquisition method for acquiring a buffer for containing data received from a remote source via a network connection.

Still another embodiment provides a system in a distributed environment, comprising a network interface configured to support a network connection with at least one other computer in the distributed environment, a memory comprising a sockets server application, a socket in communication with the sockets server application and a protocol stack in communication with the socket, wherein the protocol stack is configured to transport messages between the network interface and the socket, and a processor which when executing at least a portion of the contents of the memory is configured to perform operations for processing client-server messages. The operations comprise processing an input operation issued from the sockets server application to the socket, wherein the input operation is configured with a buffer mode parameter indicating to the socket a buffer acquisition method for acquiring a buffer for containing data received from the at least one other computer.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of apparatus, methods and articles of manufacture are provided for handling messages in a client-server environment. In particular, the computers of the client-server environment are sockets-based to facilitate a variety of I/O processing.

One embodiment of the invention is implemented as a program product for use with a computer system such as, for example, the network environment 300 shown in FIG. 3 and described below. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system, sockets layer or a specific application, or as a component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 3:
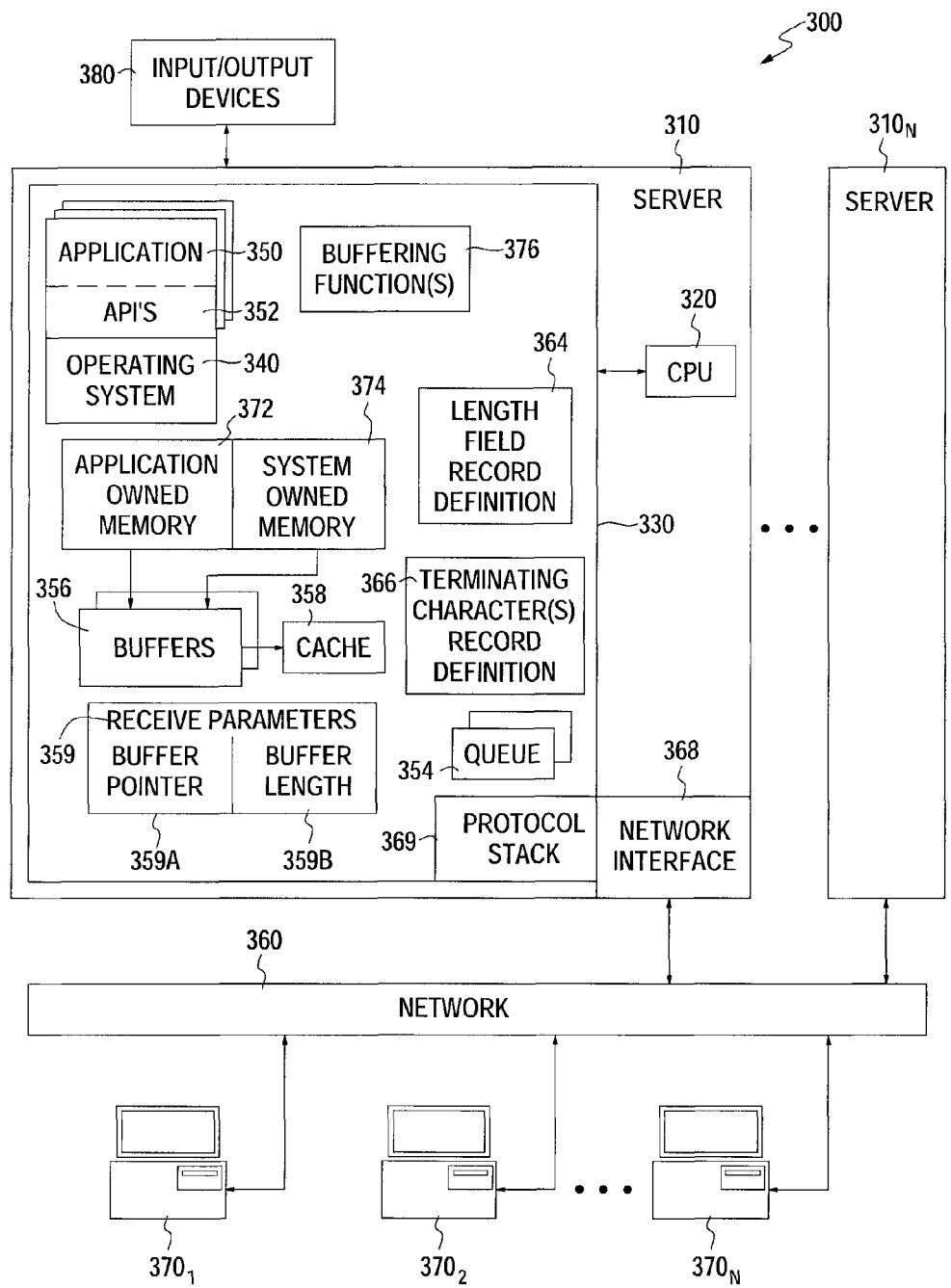
FIG. 3 is a high-level diagram of an illustrative network environment.

FIG. 3 depicts a block diagram of a distributed computer system 300. Although a specific hardware configuration is shown for distributed computer system 300, embodiments of the present invention can apply to any client-server hardware configuration, regardless of whether the computer system is a complicated, multi-user computing apparatus, a single-user workstation, or a network appliance that does not have non-volatile storage of its own.

In general, the distributed computer system 300 consists of a plurality of users or clients $370_1$-$370_n$, a network 360, one or more servers 310 and a plurality of input/output devices 380, e.g., peripheral devices. Each of the users or clients $370_1$-$370_n$ can be one or more hardware devices, e.g., a mainframe, a workstation, a personal computer, or a terminal. Alternatively, each of the clients can be a software application, process or thread residing in the memory of a hardware device.

The clients $370_1$-$370_n$ access other resources within the distributed computer system 300 via the network 360. In general, the network 360 may be any local area network (LAN) or wide area network (WAN). In a particular embodiment the network 360 is the Internet.

In turn, one or more servers $310_n$ are coupled to the network 360 and thereby communicate with the clients $370_1$-$370_n$. In a particular embodiment, the servers 310 are eServer iSeries computers available from International Business Machines, Inc. For simplicity, the details of a single server 310 are shown, where the server 310 is representative of each of the servers $310_n$. Connection of the server 310 to the network 360 is accomplished by the provision of a network interface 368. The network interface 368 may support, for example, a Token Ring or Ethernet configuration. As, such the network interface 368 may comprise a communication adapter, e.g., a local area network (LAN) adapter employing one or more of the various well-known communication architectures and protocols, e.g., the transmission control protocol/internet protocol (TCP/IP). Such protocols are represented as a protocol stack 369 in a memory 330 of the server 310.

The server 310 controls access to a plurality of peripheral devices 380 (resources). Namely, the server 310 is coupled to a plurality of peripheral devices 380 that are accessible to all the clients $370_1$-$370_n$. The peripheral devices 380 may include, but are not limited to, a plurality of physical drives (e.g., hard drives, floppy drives, tape drives, memory cards, compact disk (CD) drive), a printer, a monitor, and the like. These peripheral devices should be broadly interpreted to include any resources or services that are available to a client through a particular server.

The server 310 may comprise a general-purpose computer having a central processing unit (CPU) 320 and the memory 330 (e.g., random access memory, read only memory and the like) for managing communication and servicing user requests. The memory 330 contains the necessary programming and data structures to implement the methods described herein. Illustratively, an operating system 340 and a plurality of applications 350 (also referred to herein as "sockets server applications") are loaded and executed in the memory 330. In a particular embodiment, the operating system 340 is the OS/400 available from International Business Machines, Inc. Communication between the operating system 340 and applications 350 is facilitated by application programming interfaces (APIs) 352. Common wait points are implemented as queues 354 which may be read to and from by I/O operations. Illustrative queues that may be used to advantage include a pending queue and a completion queue. In general, a pending queue is a memory area at which a socket (or other component) may queue a pending client request in response to an input operation from a server application 350. A completion queue is a memory area where a completed request (i.e., a request that has been completely received by a server) may be queued.

The memory 330 is also shown configured with buffers 356. The buffers 356 provide a memory area into which data (e.g., client request data) can be read. Once a complete client request has been received in a buffer, one or more applications 350 may access the buffer to service the request. The location and size of the buffer into which data should be read is specified by a receive parameters data structure 359. Illustratively, the receive parameters data structure 359 may be configured with a buffer address entry 359A and a buffer length entry 359B. The buffer address entry 359A may contain a pointer to a buffer into which data should be read. On input, the buffer length entry 359B indicates the size of the buffer supplied and denotes nothing about the length of client data. In one embodiment, the specified size of the buffers supplied is large enough to accommodate the largest client request that could be received. On output, the buffer length entry 359B contains the size of the client request returned to an application 350.

In general, the buffers 356 may be allocated from available memory. In one embodiment, available memory includes application owned memory 372 and system owned memory 374. Application owned memory 372 is memory controlled by an application 350. System owned memory 374 is memory controlled by the operating system 340.

In one embodiment, a portion of the buffers 356 is configured as cache 358. The cache 358 provides a supply of buffers that may be re-used for subsequent I/O. In one embodiment, the cache contains buffers of particular sizes. For example, the cache buffers may be sized according to the most common data request sizes.

In one embodiment, record definitions are incorporated on the receive interfaces implemented by the servers 310. Illustratively, the memory 330 is shown configured with a length field record definition 364 and a terminating character record definition 366. Embodiments of the record definitions 364 and 366 are described below with reference to FIG. 5 and FIG. 6.

Once the applications 350 are executed in the memory 330, server 310 can then begin accepting and servicing client connections. It should be noted that additional software applications or modules can be executed, as required, in the memory 330. In addition, all or part of the programming and/or data structures shown in memory 330 can be implemented as a combination of software and hardware, e.g., using application specific integrated circuits (ASIC).

Figure 4:
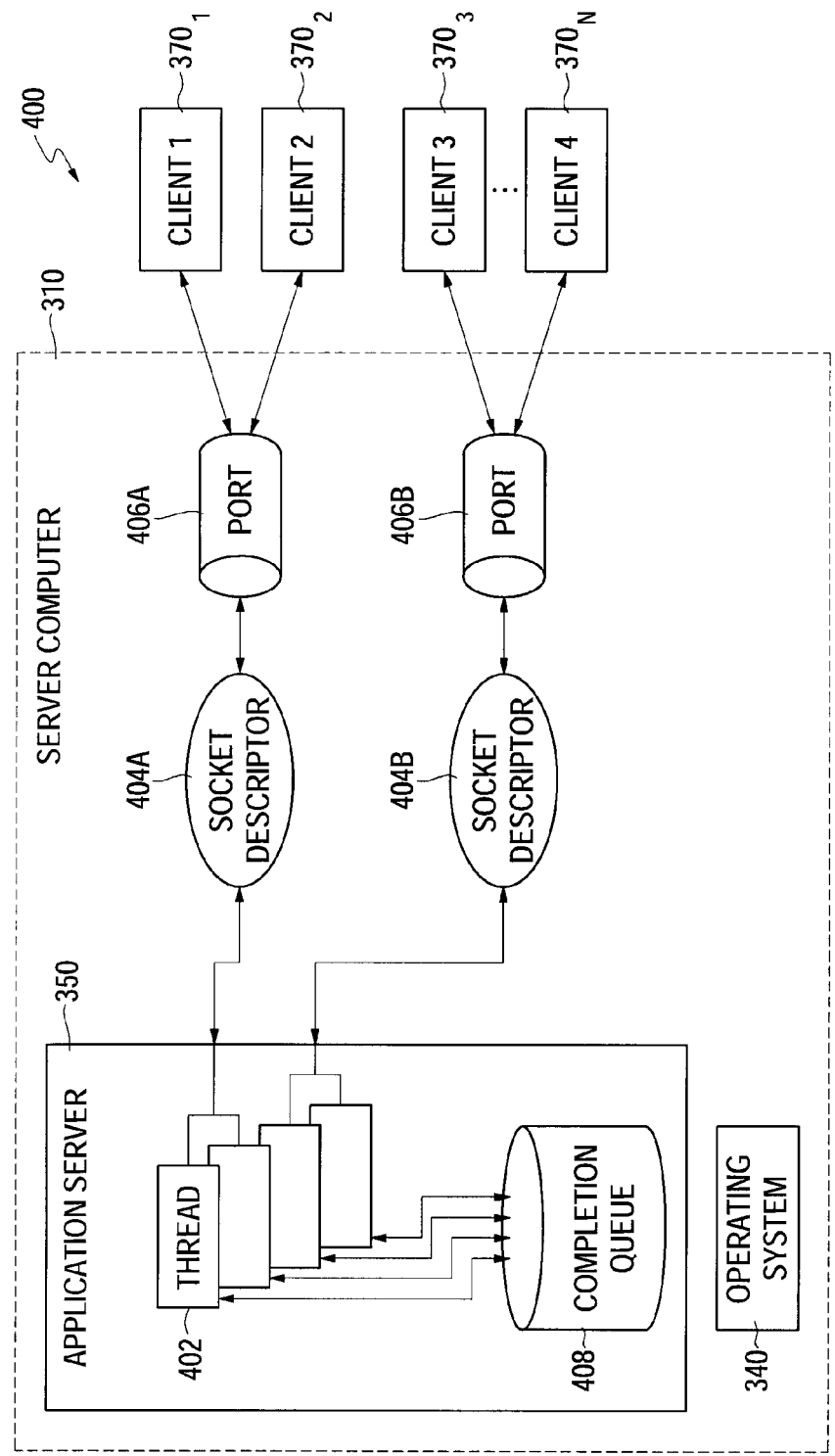
FIG. 4 is a software view of the network environment of FIG. 3.

FIG. 4 is a software view of a network environment 400 representing the distributed computer system 300 and showing the connectivity components that allow communication between the server computers 310 and the clients 370. In general, the server computer 310 is shown executing an application server 350. Although only one application server 350 is shown, it is understood that the server computer 310 may be configured with a plurality of application servers. The application server 350 has implemented a plurality of threads 402 configured to perform a particular task. In order to service client requests, each thread performs I/O operations relative to a socket descriptor 404A-B (also referred to herein as simply a socket). Each socket 404A-B, in turn, is bound to a port 406A-B which listens for incoming requests. By analogy, a port 406A-B may be understood as a mailbox to which clients 370 may submit requests. As is known in the art, ports facilitate distinction between multiple sockets using the same Internet Protocol (IP) address. In the case of asynchronous processing, the server computer 310 further includes a completion queue 408. As described above, the completion queue 408 is a memory area where a completed client request may be queued by the sockets 404A-B. The requests may then be dequeued by the appropriate thread 402. Although not shown, each of the clients 370 may be similarly configured with respective sockets and ports.

Record Based I/O

In one embodiment, a socket of at least one of the computers of the client-server environment 400 is configured to recognize a format of a message to be received from another computer, whereby the socket is configured to handle receiving the message without invoking the application(s) responsible for servicing the message until the message is completely received. In general, the message may be formatted with a length field or with terminating characters. In one embodiment, the socket utilizes a record definition to recognize the message format.

Figure 5:
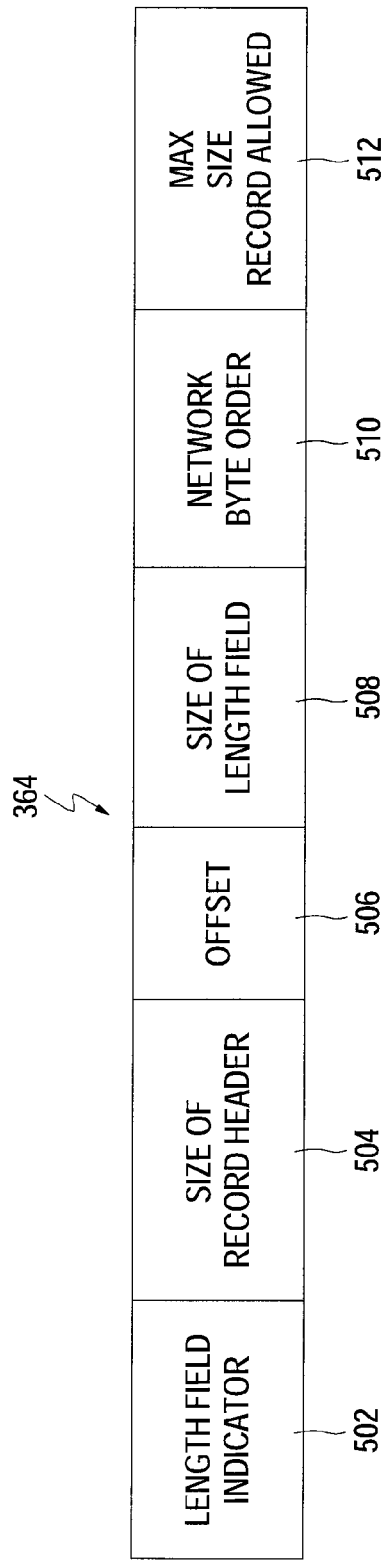
FIG. 5 is an illustrative record definition utilized for handling messages formatted with a length field.

Referring now to FIG. 5, one embodiment of a length field record definition 364 is shown. In general, the length field record definition 364 may be any data structure which is provided to a socket and indicates to the socket how to interpret a record header (i.e., the portion of the client request indicating the size of the request) provided by a client. Illustratively, the length field record definition 364 comprises a length field indicator 502, a record header size 504, an offset 506, a length field size 508, a network byte order 510, and a maximum size entry 512. The length field indicator 502 indicates whether the length field of the client request includes the record header itself or only the remaining data following the header. The record header size 504 specifies the size of the record header. The offset 506 indicates the offset within the header at which the length field begins, while the length field size 508 indicates the size of the length field. The network byte order 510 indicates a client-specified format in which the length field is stored (e.g., big/little Endian). The maximum size entry 512 specifies the maximum size client record allowed.

Figure 6:
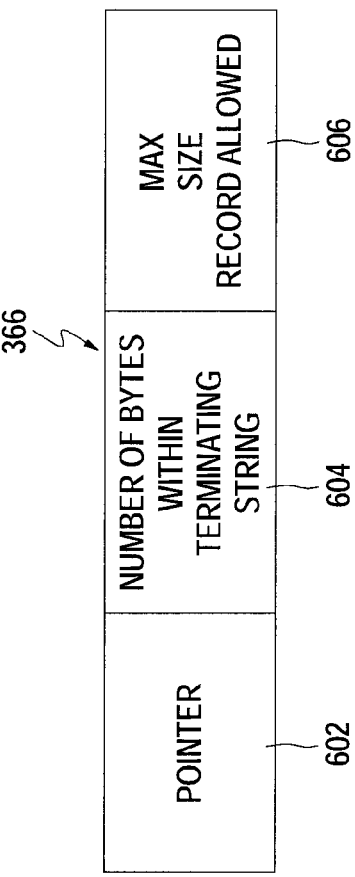
FIG. 6 is an illustrative record definition utilized for handling messages with terminating characters.

Referring now to FIG. 6, one embodiment of a terminating character record definition 366 is shown. In general, the terminating character record definition 366 may be any data structure which is provided to a sockets layer and configures the sockets layer to identify a terminating character(s) of a client request. Illustratively, the terminating character record definition 366 comprises a pointer 602, a number of bytes field 604 and a maximum size field 606. The pointer 602 points to a string which denotes the end of the client record. The number of bytes field 604 specifies the number of bytes within the terminating string. The maximum size field specifies the maximum allowable size of the client record.

Figure 7:
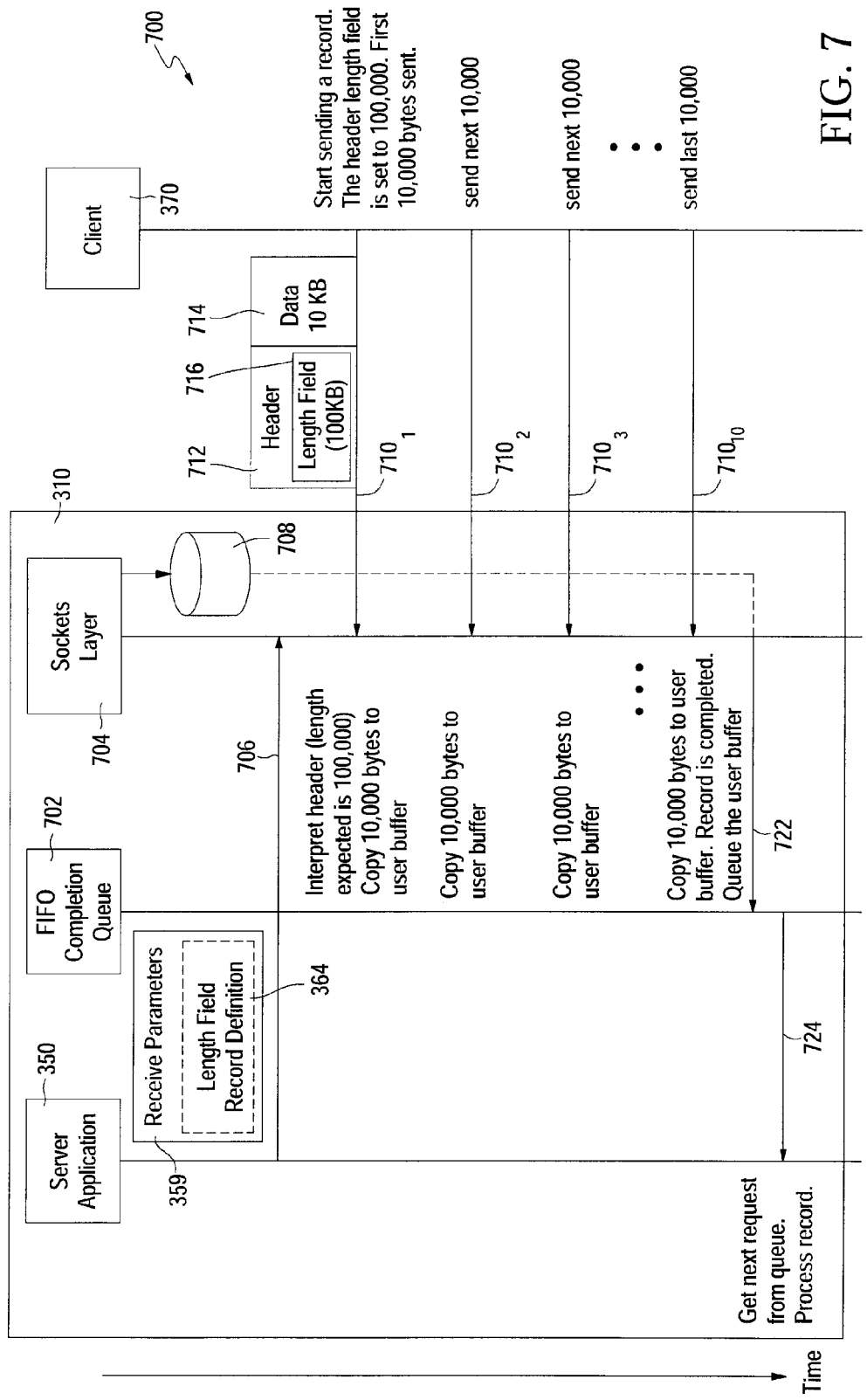
FIG. 7 is a network environment illustrating I/O operations using the record definition of FIG. 5.

FIG. 7 shows a network environment 700 illustrating the operation of the network environment 300 using the length field record definition 364. Accordingly, like numerals are used to denote components described above with reference to network 300. In general, the network environment 700 includes a server 310 communicating with a client 370. The server 310 comprises an application 350, a completion queue 702 (one of the queues 354) and a sockets layer 704 (implemented by the APIs 352).

Although not shown in FIG. 7, some preliminary operations (e.g., creating the sockets layer 704, binding to a known address, listening for client connections, accepting a client connection) are assumed to have occurred in order to establish a network communication between the server 310 and the client 370. Once a connection with the client 370 has been accepted by the server 310, the application 350 issues an asynchronous receive operation 706 to the sockets layer 704, whereby a pending record request is queued on a pending queue 708. The receive operation 706 includes a receive parameters data structure 359 and a length field record definition 364. Illustratively, the length field record definition 364 is part of the receive parameters data structure 359. However, and other embodiment, the data structures may be separate.

The receive parameters data structure 359 specifies both a buffer into which data should be read (buffer address entry 359A) and a size of the buffer (buffer length entry 359B). In one embodiment, the size of the supply buffer is sufficiently large to accommodate the largest client request that may be received.

The length field record definition 364 describes a format of an incoming client request to the sockets layer 704. Illustratively, the client request is 100,000 bytes in length and is received as a series of messages $710_{1-10}$. An initial message $710_1$ includes a header 712 and a portion of the request data 714 itself (illustratively, 10,000 bytes of the total 100 KB). The header 712 includes a length field 716. Illustratively, the length field 716 specifies a data length of 100,000 bytes to the sockets layer 704. In such an implementation, the length field indicator 502 (FIG. 5) indicates to the sockets layer 704 that the length specified by the length field 716 (FIG. 5) does not include the header 712.

Interpretation of the header 712 by the sockets layer 704 in accordance with the record definition 364 occurs upon receiving the initial message $710_1$. In addition, the 10,000 bytes of data are copied into the user buffer specified by the receive parameters data structure 359. The remainder of the client request is then received (messages $710_{2-10}$) and copied into the user buffer at 10,000 bytes increments.

After receiving the last message 710, the user buffer is queued on a completion queue 702, as represented by the queuing operation 722. The application 350 then retrieves the request from the queue 702, as represented by the dequeuing operation 724.

Figure 8:
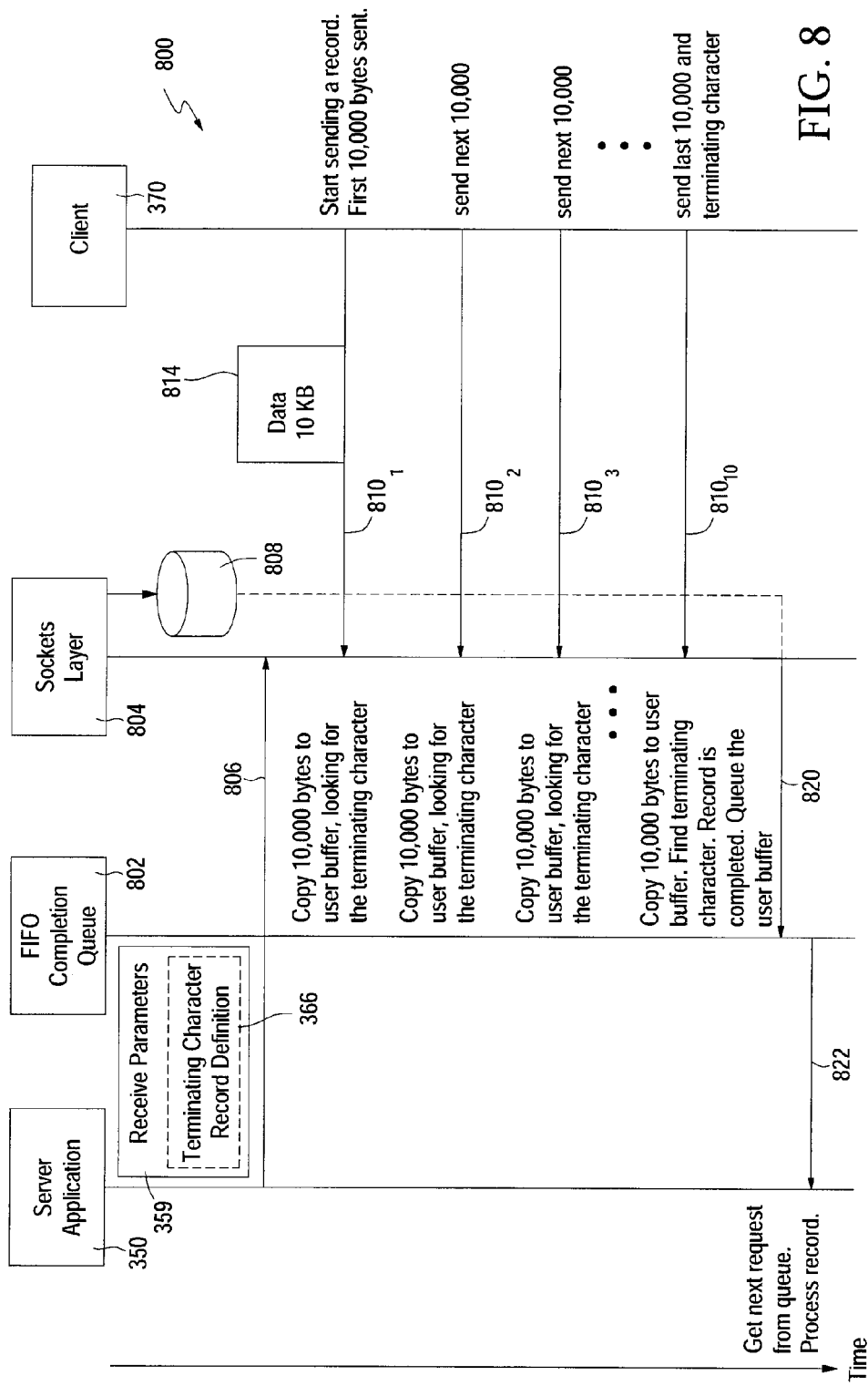
FIG. 8 is a network environment illustrating I/O operations using the record definition of FIG. 6.

FIG. 8 shows a network environment 800 illustrating the operation of the network environment 300 using the terminating character(s) record definition 366. Accordingly, like numerals are used to denote components described above with reference to network 300. In general, the network environment 800 includes a server 310 communicating with a client 370. The server 310 comprises an application 350, a completion queue 802 (one of the queues 354) and a sockets layer 804 (implemented by the APIs 352).

Although not shown in FIG. 8, some preliminary operations (e.g., creating the sockets layer 804, binding to a known address, listening for client connections, accepting a client connection) are assumed to have occurred in order to establish a network communication between the server 310 and the client 370. Once a connection with the client 370 has been accepted by the server 310, the application 350 issues an asynchronous receive operation 806 to the sockets layer 804, whereby a pending record request is queued on a pending queue 808. The receive operation 806 includes a receive parameters data structure 359 and a terminating character record definition 366. Illustratively, the terminating character record definition 366 is part of the receive parameters data structure 359. However, and other embodiment, the data structures may be separate.

The receive parameters data structure 359 specifies both a buffer into which data should be read (buffer address entry 359A) and a size of the buffer (buffer length entry 359B). In one embodiment, the size of the supply buffer is sufficiently large to accommodate the largest client request that may be received.

The terminating character record definition 366 describes a format of an incoming client request to the sockets layer 804. Illustratively, the client request is 100,000 bytes in length and is received as a series of messages $810_{1-10}$. An initial message $810_1$ includes a portion of the request data 814 itself (illustratively, 10,000 bytes of the total 100 KB). Upon receipt of each message $804_{1-10}$, the sockets layer 804 copies 10,000 bytes to the user buffer (specified by the receive parameters data structure 359) and checks the message $804_{1-10}$ for a terminating character(s). Upon locating the terminating character in the last message $804_{10}$, the user buffer is placed on a completion queue 802, as represented by the queuing operation 820. A dequeuing operation 822 then provides the completed client request to the application 350 for processing.

In this manner, the sockets layer 804 can accumulate all the data for the client request before completing the input operation. If the data is not immediately available, the record definition information will be used to asynchronously receive the data. The server application 350 need only perform one input operation per client request, thereby reducing the path length at both the server and the sockets layer.

While the foregoing embodiments describe asynchronous processing, synchronous processing is also contemplated. The manner in which synchronous processing may utilize the inventive record definition to advantage will be readily understood by those skilled in the art based on the foregoing description of asynchronous processing. Accordingly, a detailed discussion is not necessary.

Right Size Buffering

As described above, in one embodiment the size of the buffer allocated for the client request is large enough for the largest request that can be received. However, in some cases this approach may not be desired because storage is not efficiently utilized. Accordingly, in another embodiment, a buffer is acquired (i.e., allocated) only once the client data has been received. Because the client data has already been received when the buffer is acquired, the buffer may be sized exactly to the size of the client data, thereby making efficient use of storage. This approach is referred to herein as "on demand right size buffering". In general, the on demand right size buffer may be caller supplied (i.e., the buffer comes from application owned storage) or system supplied (i.e., the buffer comes from operating system owned storage).

Accordingly, the operating system 340 of the server 310 is configured for at least three modes of buffer allocation. A particular mode may be selected by adding a buffer mode parameter to the receive API. Three illustrative buffer mode parameters are referred to herein as: caller_supplied, caller_supplied_dynamic and system_supplied. Each of the buffering modes is described below. While the following discussion is directed toward asynchronous processing, persons skilled in the art will recognize application to synchronous processing by extension of the principles described.

Utilizing the caller_supplied parameter configures the server 310 to operate in a conventional manner. That is, the application 350 supplies a buffer address and a buffer length on the API call. The buffer is not used until the receive operation completes and an indication of completion has been received by the application 350. The operating system 340 loads the buffer asynchronously to the application 350.

The caller_supplied_dynamic buffering mode allows the application 350 to supply a callback function 376 to be called by the operating system 340 in order to obtain a right sized buffer allocated from application owned memory 372. No buffer pointer needs to be supplied on the asynchronous receive operation, thereby avoiding unnecessarily tying up memory. In some cases, a buffer length specifying the amount of data requested may be provided. In other cases, one of the previously described record definitions 364,366 may be provided.

In one embodiment, data copy when using the caller_supplied_dynamic buffer mode parameter does not occur asynchronously to the server thread. However, when running on a multiprocessor system it may be advantageous to provide for asynchronous copies. Accordingly, to provide for asynchronous copies when using the caller_supplied_dynamic buffer mode parameter, the application 350 may optionally supply a buffer to be used. If the supplied buffer is not large enough, then another buffer will be acquired using the callback function 376.

Figure 9:
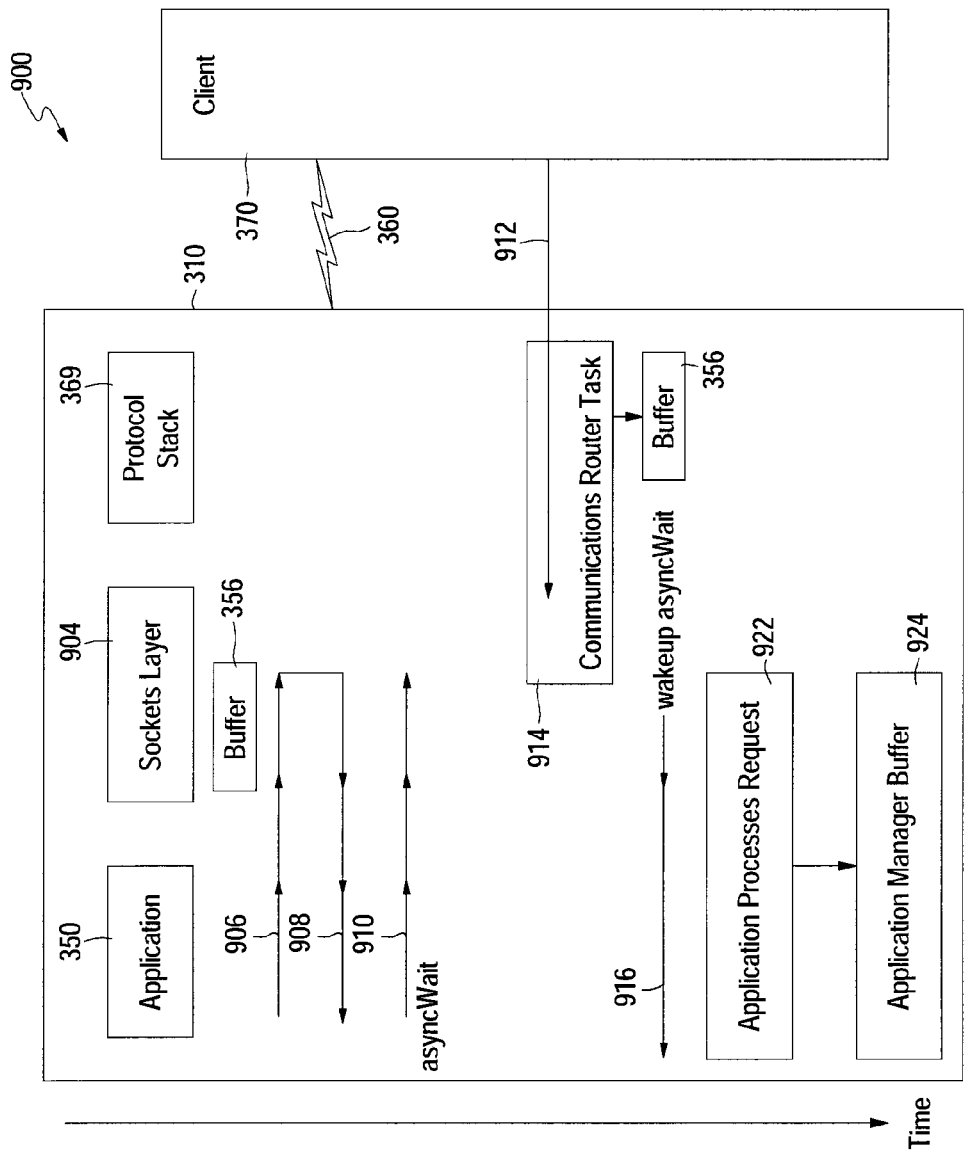
FIG. 9 is a network environment illustrating I/O operations when using a first buffer mode and allocating a typical size buffer.
Figure 10:
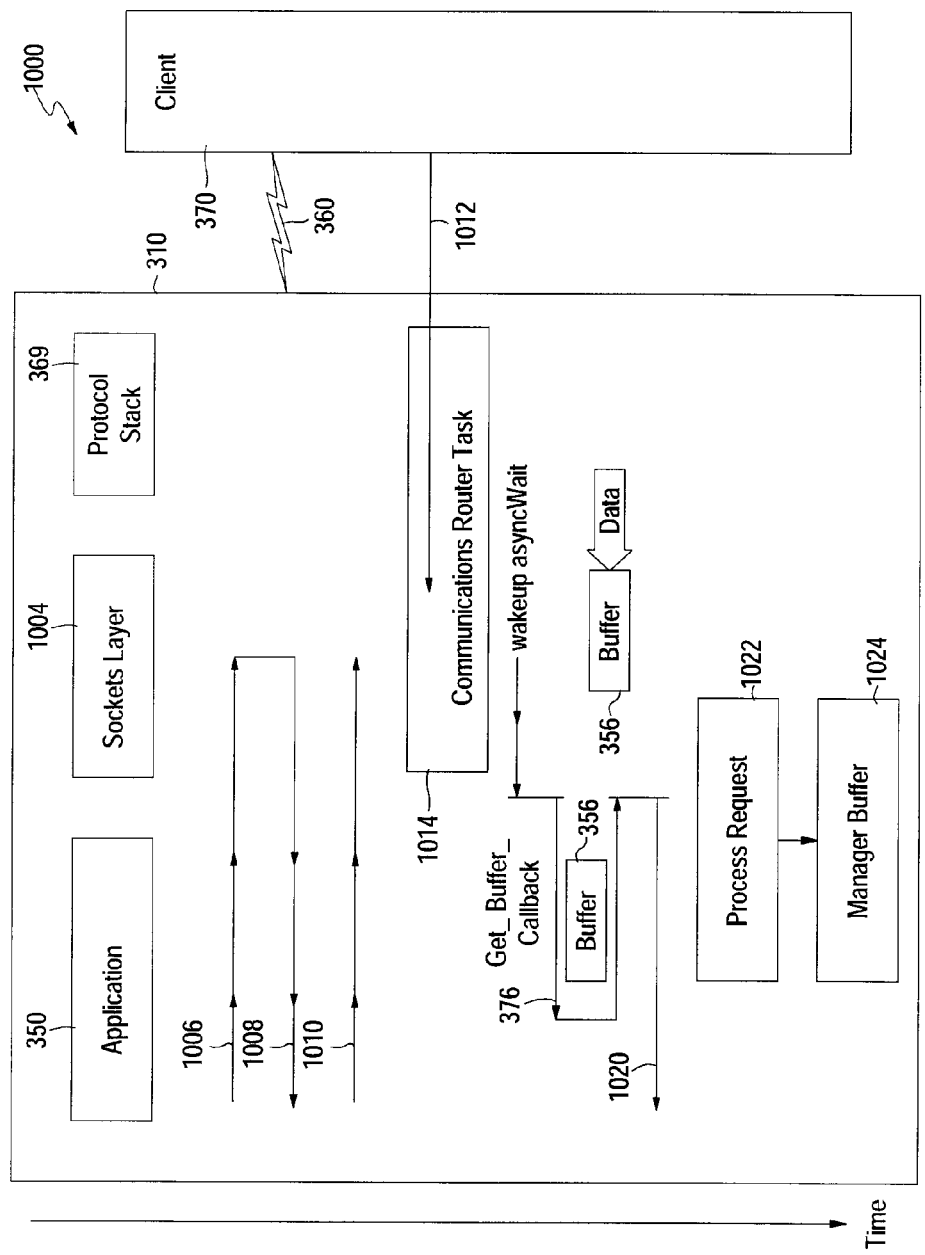
FIG. 10 is a network environment illustrating I/O operations when using the first buffer mode and allocating no buffer or allocating a typical size buffer which is determined to be too small.

FIGS. 9-10 are network environments illustrating I/O operations of the network environment 300 when using the caller_supplied_dynamic buffer mode parameter. Accordingly, like numerals are used to denote components described above with reference to network 300. In general, the network environments 900 and 1000 shown in FIGS. 9 and 10, respectively, include a server 310 communicating with a client 370. The server 310 comprises an application 350, a sockets layer 904/1004 (implemented by the APIs 352) and the protocol stack 369.

Referring first to FIG. 9, a network environment 900 is shown illustrating I/O operations of the network environment 300 using when using the caller_supplied_dynamic buffer mode parameter and allocating a typical size buffer. Initially, the application 350 issues an asynchronous receive operation 906 with a caller_supplied_dynamic buffer mode parameter and specifying a typical sized buffer from the application owned memory 372. The sockets layer 904 reports with a response 908 indicating that the sockets layer 904 is ready to begin accepting client connections. The application 350 then issues an asynchronous wait operation 910 which may be queued by the sockets layer 904. Incoming client data 912 is then received by the sockets layer 904 on a client connection. Once a full client record has arrived, and if the allocated typical sized buffer is large enough, a communications router task 914 operates to asynchronously copy the record into the buffer. As used herein, the communications router task 914 is any operation which delivers data. The particular implementation of the task 914 may vary according to the operating system being used. In any case, a wakeup operation 916 is then issued and the application 350 receives the client request for processing. After processing the request (block 922), the application 350 manages the typical sized buffer according to its own memory management scheme (block 924). Accordingly, such embodiment facilitates integration into existing buffering allocation models of applications.

FIG. 10 is a network environment 1000 illustrating I/O operations of the network environment 300 when using the caller_supplied_dynamic buffer mode parameter and allocating no buffer or allocating a typical size buffer which is determined to be too small. Initially, the application 350 issues an asynchronous receive operation 1006 with a caller_supplied_dynamic buffer mode parameter and specifying a typical sized buffer from the application owned memory 372. In general, the asynchronous receive operation 1006 specifies one of a length to receive, a length field record definition 364, or a terminating character record definition 366. The sockets layer 1004 reports with a response 1008 indicating that the sockets layer 1004 is ready to begin accepting client connections. The application 350 then issues an asynchronous wait operation 1010 which may be queued by the sockets layer 1004. Incoming client data 1012 is then received by the sockets layer 1004 on a client connection. In the present illustration, it is assumed that no buffer was allocated or that the allocated typical sized buffer is not large enough. Accordingly, a communications router task 1014 operates to handle the incoming data by queuing the data internally until the full record is received. Following a wakeup operation 1016, which is posted to a completion queue (not shown), the callback function 376 is called by the sockets layer 1004 to acquire a right sized buffer 376. If a typical sized buffer was previously allocated with the asynchronous receive operation 1006, the typical size buffer is returned to the application 350. It is noted that in the event a length field record definition 364 is used the right sized buffer 376 may be acquired once the client record header has been interpreted by the sockets layer 1004. Upon acquiring the right sized buffer 356 from the application 350, the sockets layer 1004 operates to copy the client data into the right sized buffer and then return the buffer 356 to the application 350, as indicated by the return operation 1020. In this case, the data copy occurs synchronously, i.e., in the context of the application thread. After processing the request (block 1022), the application 350 manages the allocated buffer according to its own memory management scheme (block 1024). Accordingly, such embodiment facilitates integration into existing buffering allocation models of applications.

Figure 11:
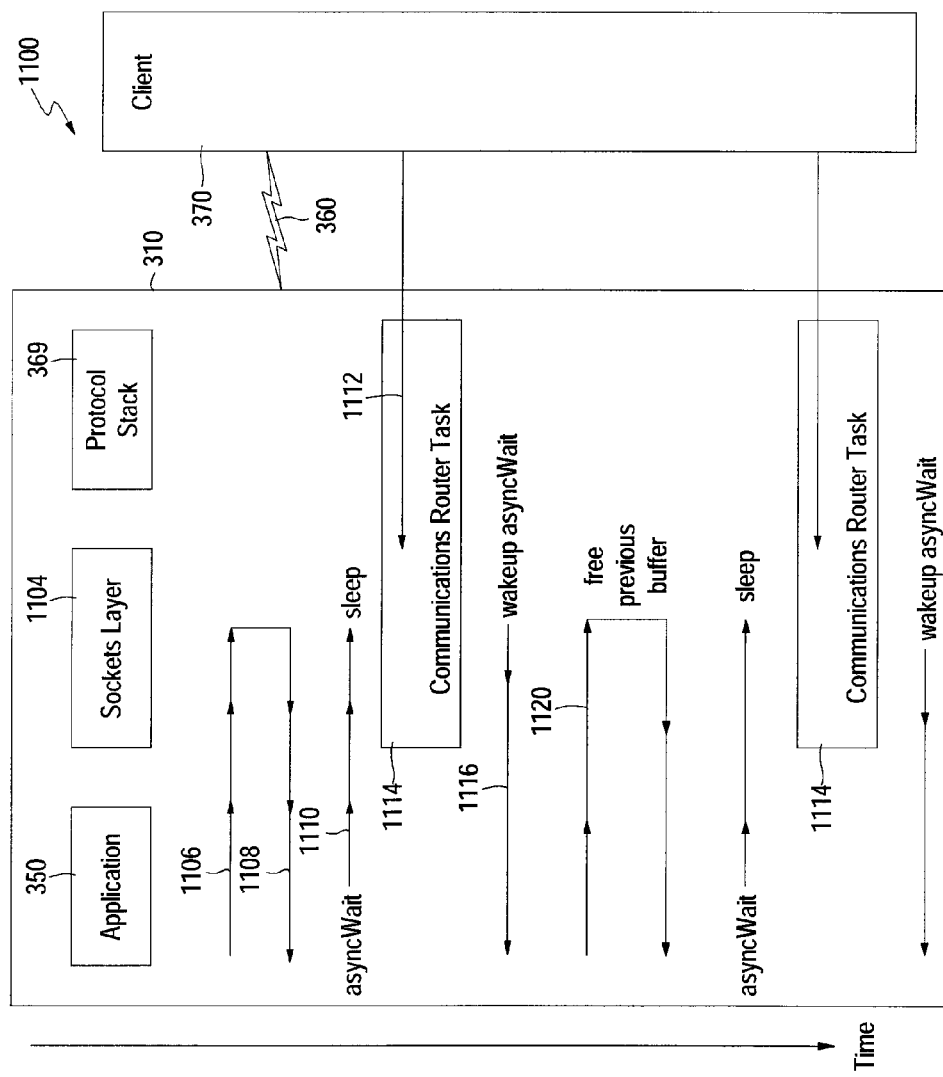
FIG. 11 is a network environment illustrating I/O operations when using a system_supplied buffer mode parameter.

FIG. 11 is a network environment 1100 illustrating I/O operations of the network environment 300 when using the system_supplied buffer mode parameter. Accordingly, like numerals are used to denote components described above with reference to network 300. In general, the network environment 1100 shown in FIG. 11 includes a server 310 communicating with a client 370. The server 310 comprises an application 350, a sockets layer 1104 (implemented by the APIs 352) and the protocol stack 369.

Initially, the application 350 issues an asynchronous receive operation 1106 with a system_supplied buffer mode parameter. The sockets layer 1104 reports with a response 1108 indicating that the sockets layer 1104 is ready to begin accepting client connections. The application 350 then issues an asynchronous wait operation 1110 which may be queued by the sockets layer 1104. Incoming client data 1112 is then received on a client connection and is handled by communications router task 1114. As the data arrives, a system owned buffer is acquired. Specifically, the buffer may be allocated from unallocated system owned memory 374 or may be taken from a cache 358 of previously allocated system owned memory 374. The length of the buffer is based on a length in the original asynchronous receive operation 1106 or is determined according to the specification of a record definition 364, 366. In the case of a record definition, the sockets layer 1104 preferably waits until the entire client record has arrived and then operates to right size the buffer. However, in the case of a length field record definition 364, the buffer may be acquired once the record header has been interpreted by the sockets layer 1104. An asynchronous wakeup operation 1116 then issues to dequeue the application thread responsible for processing the client request. At this point, the application 350 has received the client request in system supplied memory. Once the application 350 has finished processing the request, the application 350 may release the system-supplied memory with a free_buffer( ) command (one of the inventive APIs 352 configured to free system-supplied memory) or may implicitly free the buffer by using it on the next asynchronous receive operation 1120.

The latter embodiment (i.e., system_supplied buffer mode) provides a number of advantages. First, the data buffer for incoming data is obtained at the time it is needed, resulting in a minimal paging rate. Second, the data buffer is correctly sized based on the data request, thereby efficiently and fully utilizing storage. Third, the record definitions 364, 366 described above can be used to advantage. Fourth, data is copied asynchronously. Fifth, automatic buffer allocation and caching is enabled and managed by the system, providing for improved performance.

Controlling Socket Server Send Buffer Usage

In other embodiments, methods, systems and articles of manufacture are provided for improving performance and throughput while reducing memory requirements of sockets server applications. In some cases, these embodiments may be used in tandem with the embodiments described above. While synergistic in some cases, such combination and cooperation between embodiments is not necessary in every implementation.

The embodiments described in this section (i.e., "Controlling Socket Server Send Buffer Usage") make system-supplied storage available to socket server applications to be used when sending data. In one embodiment, standard synchronous sockets interfaces for controlling socket attributes are configured with an inventive attribute which specifies that all storage to be used on send operations will be system-supplied. Such standard synchronous sockets interfaces include ioctl( ) and setsockopt( ). Once such system-supplied storage is used on a send operation, it is considered to be "given back" to the system. Therefore, the system is allowed to hold onto the storage as long as needed without affecting individual applications. Further, data copies from application buffers to system buffers is avoided, thereby improving performance and throughput. In some embodiments, the data may be DMA'd (direct memory accessed) by a communications protocol stack. The system-supplied storage can be managed and cached on behalf of any or all server applications to reduce paging rates and storage demand. When used in combination with the embodiments described in the section entitled "RIGHT SIZE BUFFERING", the present embodiments reduce multiple function calls. Specifically, calls to alloc ( )/malloc ( ) storage are unnecessary if a buffer is received on incoming data and calls to free ( ) storage are unnecessary if the buffer is then used on a send operation. This benefit is particularly advantageous in a request/response architecture where a server application waits for requests, performs some work, and sends a response. In such an architecture, the request arrives in system-supplied storage, the work is done and the same system-supplied storage can then be used for the response. These and other advantages may be achieved according to the description that follows. It is understood that the foregoing advantages are merely illustrative results achieved in some embodiments. Implementations which do not achieve these advantages may nevertheless be considered within the scope of the invention as defined by the claims appended hereto.

Figure 12:
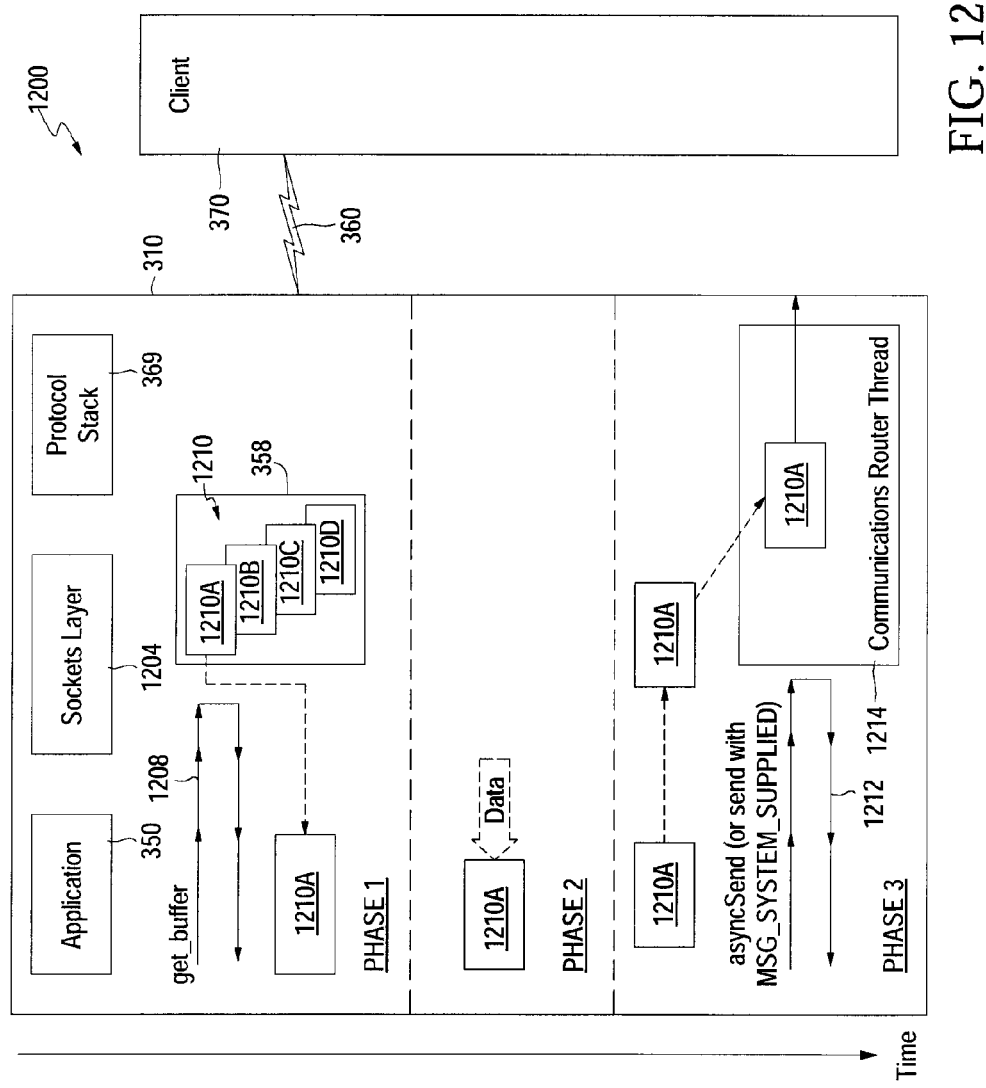
FIG. 12 is a network environment illustrating I/O operations when using system_supplied buffers acquired by a function call from an application.

Referring now to FIG. 12, a network environment 1200 is shown illustrating I/O operations of the network environment 300 when using the system_supplied buffers acquired by a function call from an application. Accordingly, like numerals are used to denote components described above with reference to network 300. In general, the network environment 1200 includes a server 310 communicating with a client 370 via a network 360. The server 310 comprises an application 350, a sockets layer 1204 (implemented by the APIs 352) and the protocol stack 369.

The operations performed in the network environment 1200 are illustratively described in three phases. The phases are not limiting of the invention and are merely provided to facilitate a description of the operations performed in the network environment 1200. The operations may be synchronous or asynchronous. In a first phase, the application 350 issues a buffer acquisition operation 1208 by invoking a get_buffer function call 376. In response, a system-supplied buffer 1210A is acquired by the sockets layer 1204 and returned to the application 350. The system-supplied buffer 1210 may be retrieved from a cache 358 containing a plurality of buffers 1210 or may be allocated from available system owned memory 374. In a second phase, the application 350 uses the system-supplied buffer 1210A in any manner needed. Illustratively, the application 350 reads data directly into the buffer 1210A. In a third phase, the application 350 initiates a send operation 1212 whereby the buffer 1210A is provided to the sockets layer 1204. The buffer 1210A is then detached from the user request (i.e., no longer available to the application 350) and the send operation 1212 returns.

It is contemplated that the send operation 1212 may be synchronous (send with MSG_SYSTEM_SUPPLIED) or asynchronous (asyncSend). In the case of a synchronous send, standard synchronous sockets interfaces for sending data may be configured with an inventive flag value. By way of illustration, the flag value is shown in FIG. 12 as MSG_SYSTEM_SUPPLIED. In another embodiment, the flag value is provided with the inventive attribute on the standard synchronous sockets interfaces for controlling socket attributes (e.g., ioctl ( ) and setsockopt ( )), which were described above. In any case, the flag value indicates that the memory used on send interfaces is defined as system-supplied.

In the third phase, the detached buffer 1210A is under the control of a communications router thread 1214 and may be used by the sockets layer 1204 and the protocol stack 369. In some cases, DMA processing is used. In any case, no data copy is necessary. Once the data is sent, the buffer 1210 is freed (using a free_buffer( ) function call 376) or is cached for use on the next system-supplied operation. During this time/phase the application 350 continues processing (e.g., reading data and preparing to send more data). Although not shown in FIG. 12, the application 350 eventually uses asyncWait ( ) to determine whether the send processing has succeeded.

Figure 13:
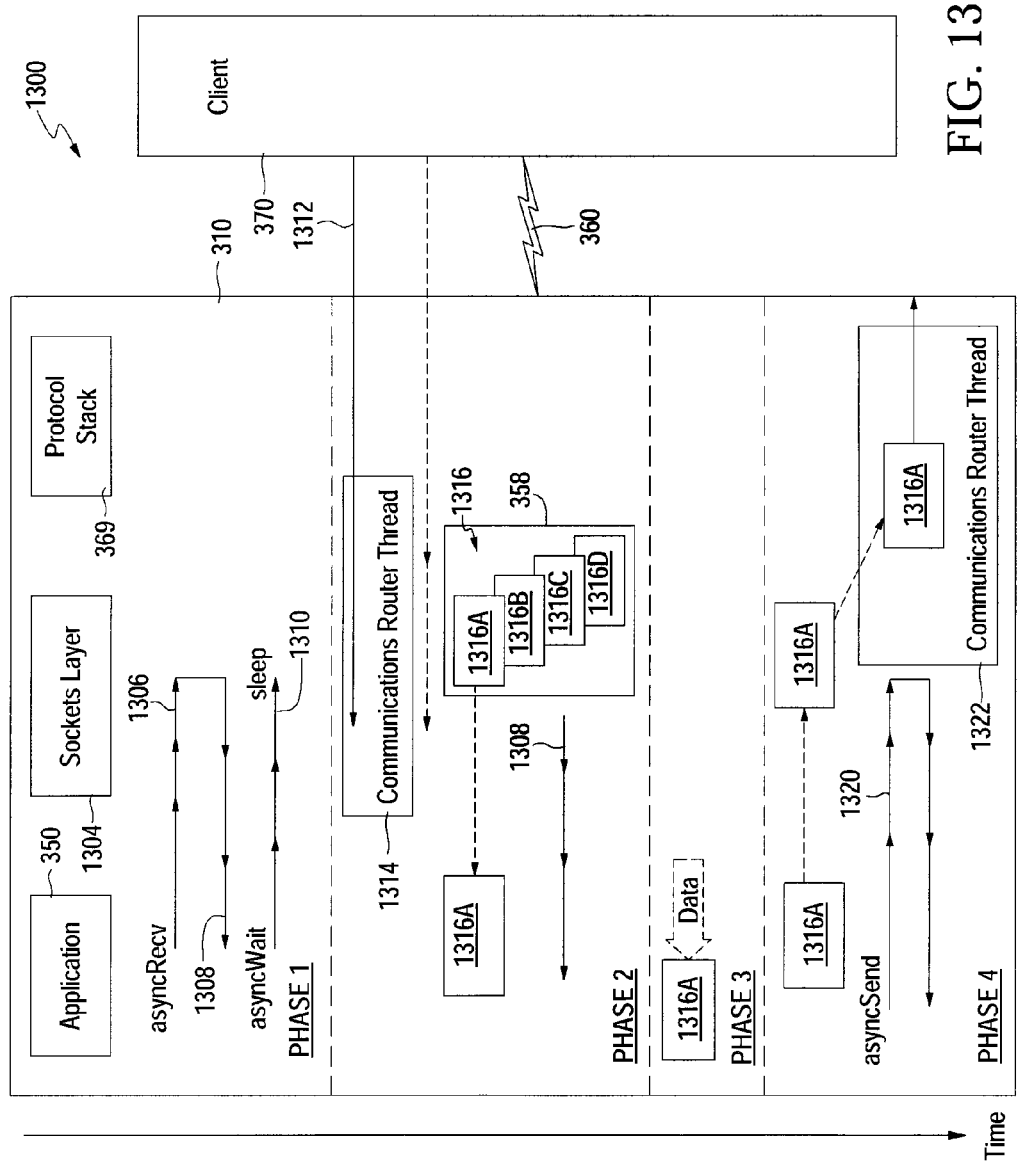
FIG. 13 is a network environment illustrating I/O operations when using system_supplied buffers acquired by an asynchronous receive operation with a buffer_mode parameter set to "system_supplied".

Referring now to FIG. 13, a network environment 1300 is shown illustrating I/O operations of the network environment 300. Accordingly, like numerals are used to denote components described above with reference to network 300. In particular, network environment 300 illustrates I/O operations when using system_supplied buffers (from the system owned memory 374) acquired by an asynchronous receive operation with a buffer_mode parameter set to "system_supplied". Such a buffer mode parameter has been described above with reference to, for example, FIG. 11.

In general, the network environment 1300 includes a server 310 communicating with a client 370 via a network 360. The server 310 comprises an application 350, a sockets layer 1304 (implemented by the APIs 352) and the protocol stack 369.

In a first phase, the application 350 issues an asynchronous receive operation 1306 with a system_supplied buffer mode parameter. The sockets layer 1304 reports with a response 1308 (i.e., the receive operation is returned) indicating that the sockets layer 1304 is ready to begin accepting client connections. The application 350 then issues an asynchronous wait operation 1310 which may be queued by the sockets layer 1304.

In the second phase, incoming client data 1312 is received on a client connection and is handled by communications router task 1314. As the data arrives, a system-supplied buffer 1316A is acquired and the data is placed in the buffer 1316A. The buffer 1316A may be allocated from unallocated system owned memory 374 or may be taken from a cache 358 containing a plurality of buffers 1316 from previously allocated system owned memory 374. In one embodiment, the cache buffers 1316 are of selective sizes. Such an approach is particularly efficient if the application 350 uses only a few different sizes of buffers. For example, if most application records are 1K, 4K or 16K then the cache 358 will only contain buffers of this size. Illustratively, the length of the buffer is based on a length in the original asynchronous receive operation 1306 or is determined according to the specification of a record definition 364, 366. In the case of a record definition, the sockets layer 1304 preferably waits until the entire client record has arrived and then operates to right size the buffer. However, in the case of a length field record definition 364, the buffer may be acquired once the record header has been interpreted by the sockets layer 1304. An asynchronous wakeup operation 1318 then issues to dequeue the application thread responsible for processing the client request. At this point, the application 350 has received the client data in the system-supplied buffer 1316A.

In a third phase, the application 350 uses the system-supplied buffer 1316A in any manner needed. Illustratively, the application 350 reads data directly into the buffer 1316A. In a fourth phase, the application 350 initiates a send operation 1320 whereby the buffer 1316A is provided to the sockets layer 1304. The buffer 1316A is then detached from the user request (i.e., no longer available to the application 350) and the send operation 1320 returns.

In the fourth phase, the detached buffer 1316A is under the control of a communications router thread 1322 and may be used by the sockets layer 1304 and the protocol stack 369. In some cases, DMA processing is used. In any case, no data copy is necessary. Once the data is sent, the buffer 1316A is freed (using a free_buffer ( ) function call 376) or is cached for use on the next system-supplied operation. During this time/phase the application 350 continues processing (e.g., reading data and preparing to send more data). Although not shown in FIG. 13, the application 350 eventually uses asyncWait ( ) to determine whether the send processing has succeeded.

Continuous I/O Request Processing

Another embodiment provides for continuous modes for both asynchronous accepts and asynchronous receives. Accordingly, only a single asynchronous accept needs to be performed on a listening socket and only a single asynchronous receive needs to be performed on each connected socket. This approach dramatically reduces redundant accept and receive processing at both the application and operating system levels. In addition, processing of both the server and the client is substantially improved.

Figure 14:
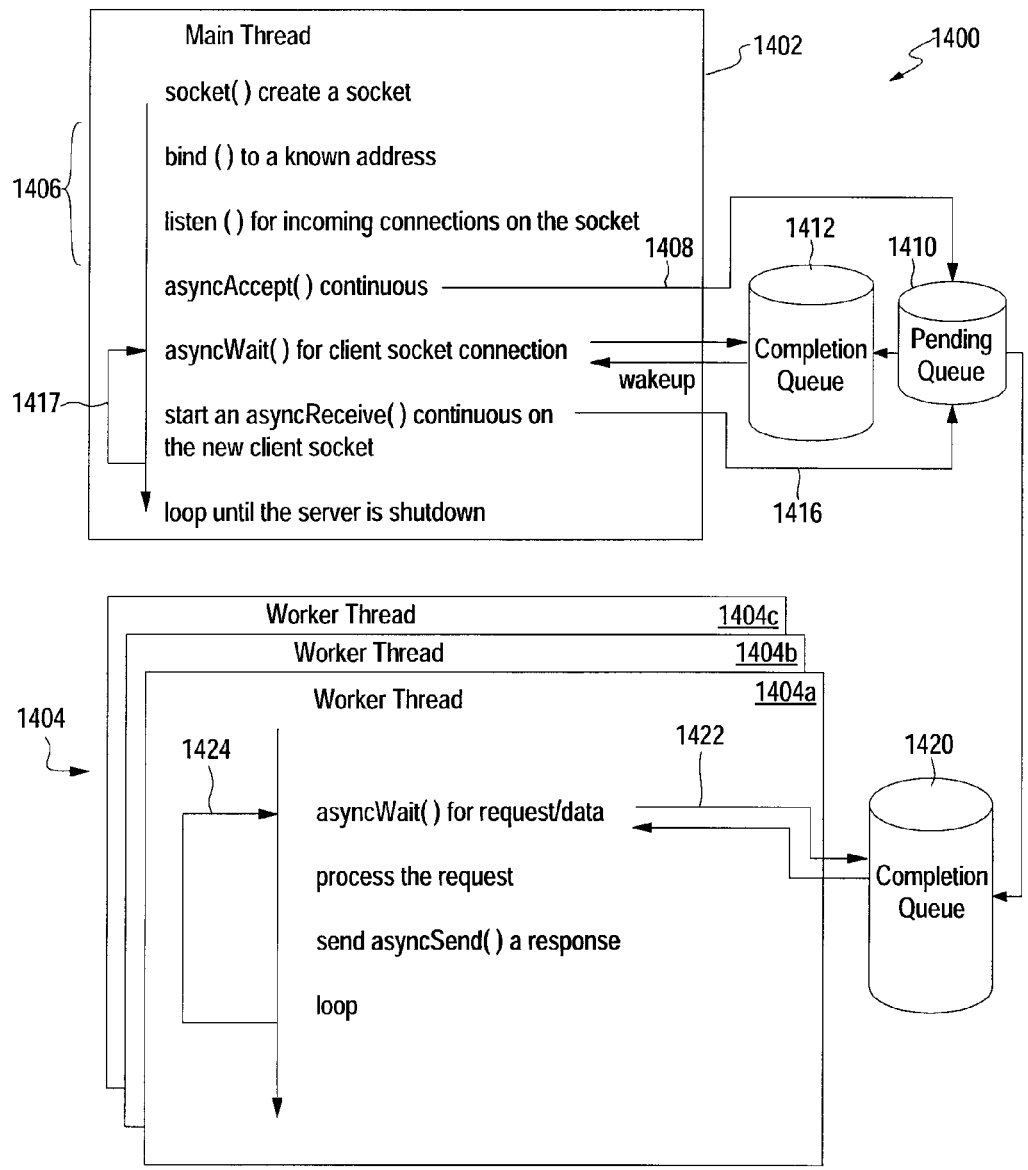
FIG. 14 is a network environment illustrating continuous modes for both asynchronous accepts and asynchronous receives.

FIG. 14 shows a network environment 1400 illustrating I/O operations of the network environment 300. Some aspects of the network environment 1400 have been simplified in order to emphasize other aspects. In addition, the operations described with reference to the network environment 1400 assume the use of at least one of the record definitions 364 and 366 described above. In general, the network environment 1400 comprises a main thread 1402 and a plurality of worker threads 1404. Each of the threads are representative threads of the application 350 (shown in FIG. 3). An initial series of operations 1406 includes creating a socket (socket ( )), binding to a known address (bind ( )) and listening for incoming connections on the socket (listen ( )). An asynchronous continuous accept operation 1408 is then issued to accept a new client connection. In particular, only a single continuous accept operation 1408 is issued and results in a pending accept data structure (not shown) being placed on a pending queue 1410. Completed accepts are then dequeued from an accept completion queue 1412 by an asynchronous wait operation 1414 issued by the main thread 1402. The main thread 1402 then initiates an asynchronous continuous receive operation 1416. Only a single asynchronous continuous receive operation 1416 is issued for each client connection and results in a pending receive data structure (not shown) being placed on the pending queue 1410. A loop 1417 defines repetitious request processing performed by the main thread 1402. Note that the loop 1417 does not include redundant accept operations. Once a completed client record has been received, a completed receive data structure (not shown) is placed on a receive completion queue 1420. Completed receives are dequeued from the completion queue 1420 by an asynchronous wait operation 1422 issued by a worker thread 1404A. A loop 1424 defines repetitious request processing performed by the worker thread 1404A. Note that the loop 1424 does not include redundant receive operations.

Figure 1:
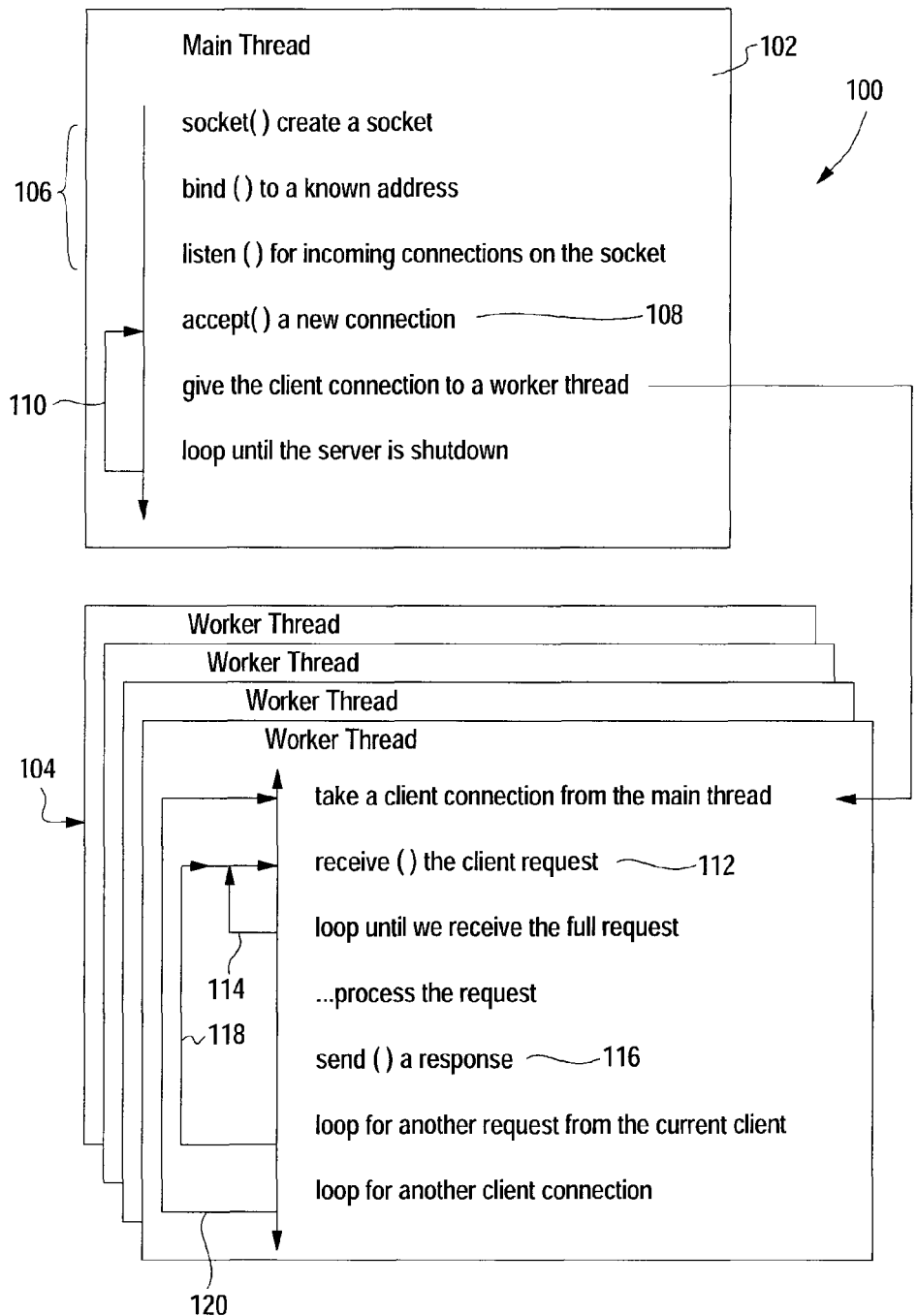
FIG. 1 is a software view of a server environment illustrating prior art synchronous I/O operations.
Figure 2:
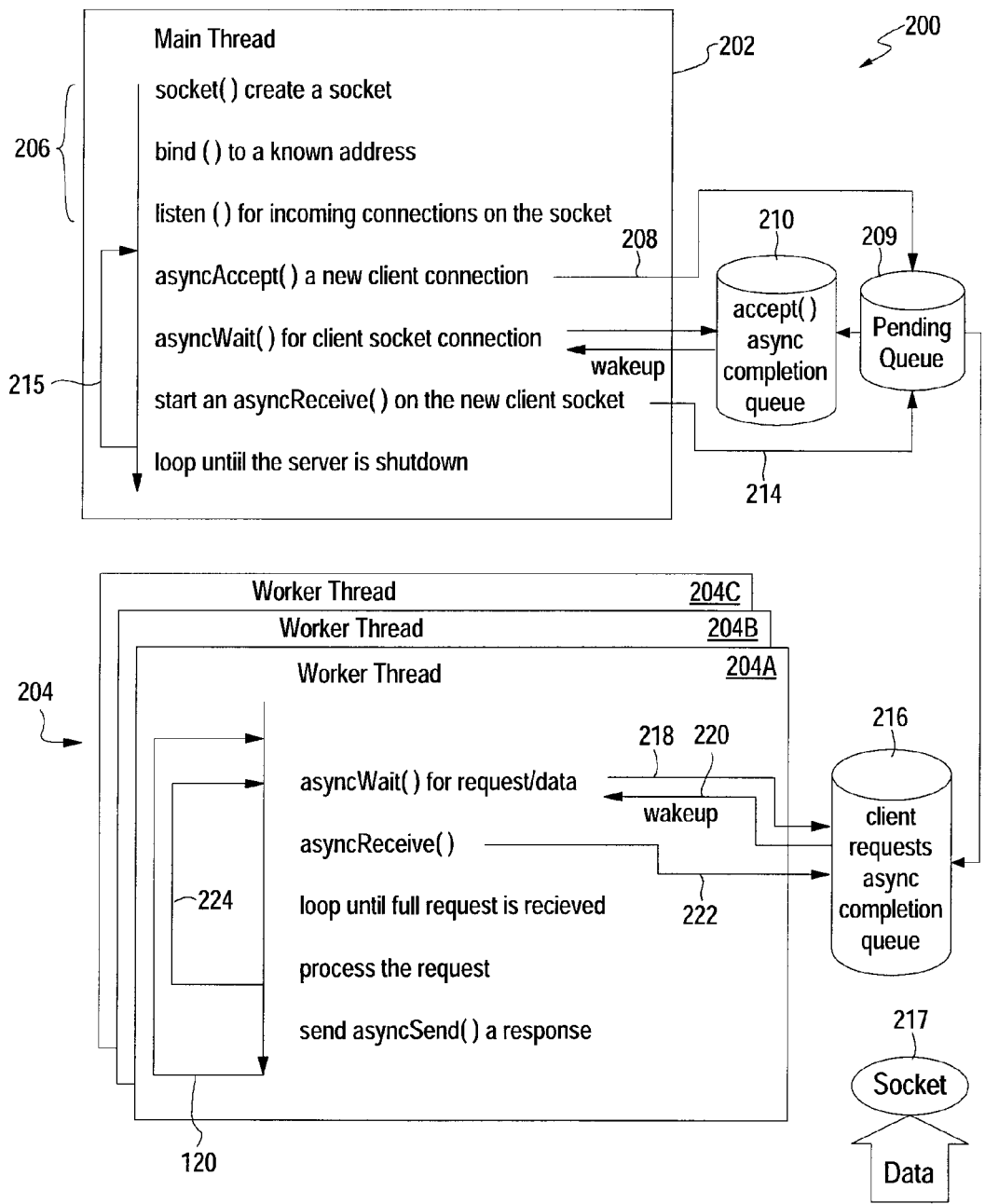
FIG. 2 is a software view of a server environment illustrating prior art asynchronous I/O operations.

Accordingly, as is evident by comparison of FIG. 14 with FIGS. 1 and 2, various redundant processing has been eliminated. Comparing FIG. 14 to FIG. 2, for example, the asynchronous accept operation 208 has been taken out of the loop 215 and replaced with the asynchronous continuous accept operation 1408. Further, the loop 224 has been eliminated by virtue of utilizing the record definitions 364/366 and the need for redundant asynchronous receives 222 issued by a worker thread has been eliminated.

Figure 15:
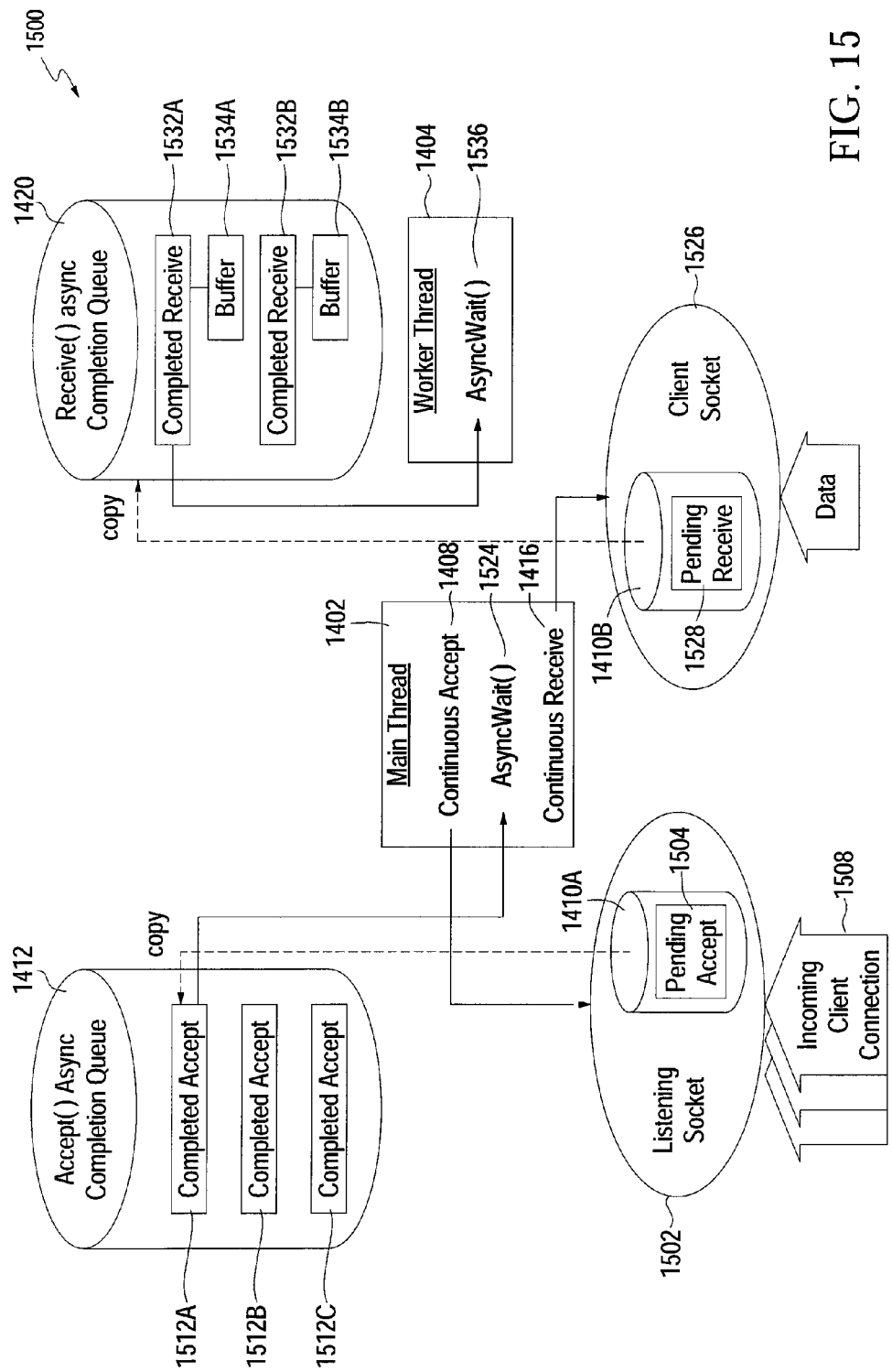
FIG. 15 is a network environment illustrating continuous modes for both asynchronous accepts and asynchronous receives.

The foregoing continuous processing modes may be further described with reference to FIG. 15. FIG. 15 shows a network environment 1500 representative of the network environment 300 in FIG. 3. Initially, a main thread issues a single continuous accept operation 1408 on a listening socket 1502. As a result of the accept operation 1408, a single pending accept data structure 1504 is queued on a pending queue 1410A which is part of the listening socket 1502. The pending accept data structure 1504 is configured with a plurality of parameters which facilitate servicing of incoming client connections requests 1508. Illustratively, the parameters specify the accept completion queue 1412 for placing completed accepts 1512A-B and further specify that the pending accept data structure 1504 is configured for continuous mode processing. Other parameters known in the art may also be included.

In operation, incoming client connections 1508 are received on the listening socket 1502. The pending accept data structure 1504 is then configured for a particular client connection 1508 and, subsequently, copied into a completed accept data structure 1512A on the accept completion queue 1412. In this manner, the pending accept data structure 1504 remains on the pending queue 1410. The completed accept data structure 1512 may then be populated with completion information such as a socket number, address, etc. The completed accept data structures 1512 are dequeued from the accept completion queue 1412 by an asynchronous wait operation 1524 issued by the main thread 1402.

The main thread 1402 then issues a continuous receive operation 1416 on a client socket 1526 which is configured with a pending queue 1410B. Only a single continuous receive operation 1416 is needed for each connected client socket and each operation 1416 specifies a continuous mode, a manner of acquiring a buffer, a manner of recognizing a format of incoming client data, etc. As a result of the continuous receive operation 1416, a pending receive data structure 1528 is placed on the pending queue 1410B. Parameters of the pending receive data structure 1528 specify the receive completion queue 1420 for placing completed receive data structures 1532A-B, that the pending receive data structure 1528 is configured for continuous mode processing and that a system supplied buffer will be used. The parameters of the pending receive data structure 1528 also specify a length field record definition or a terminating character record definition as described above. Other parameters known in the art may also be included.

Once a completed client record has been received, the pending receive data structure 1528 is copied to the receive completion queue 1420. Accordingly, a plurality (two shown) of completed receive data structures 1532A-B are shown on the receive completion queue 1420. Each completed receive data structure 1532A-B has an associated buffer 1534A-B containing client data. In particular, the buffers 1534A-B are allocated from system owned memory 374, as has been described above. The provision of a separate buffer 1534A-B for each completed receive data structure 1532A-B overcomes conventional implementations in which a single buffer is provided for each pending receive data structure. Because the present embodiment utilizes only a single pending receive data structure 1528, a single buffer is insufficient for handling a multiplicity of client requests.

The completed receive data structures 1532A-B are then removed from the completion queue 1420 by an asynchronous wait operation 1536 issued by the worker thread 1404. The worker thread 1404 may then take steps to process the client request.

Conclusory Remarks

The embodiments described in the present application may be implemented in a variety of fashions. For example, in some cases changes may be made to existing operating systems. In other cases changes may be made to socket interfaces. In still other cases, changes may be made to both the operating system and the socket interfaces. These changes may include modifications to existing code or the provision of new code. It is understood that the particular implementation undertaken may, to some extent, depend on the particular operating system and socket interfaces (and possibly other code or hardware) being used/changed. Accordingly, the manner in which the invention is implemented is not considered limiting of the invention. Rather, the principles described herein will enable any person skilled in the art to make the invention.

Further, is understood that use of relative terms is made throughout the present application. For example, a particular relationship between servers and clients in a distributed system has been assumed. However, the status of a machine as a server or client is merely illustrative and, in other embodiments, the functionality attributed to a server is available on the client, and vice versa.

While the foregoing is directed to embodiments of the present invention, other and further embodiments of the invention may be devised without departing from the basic scope thereof, and the scope thereof is determined by the claims that follow.

What is claimed is:

1. A non-transitory computer readable storage medium containing a program which, when executed by a computer, performs operations for processing messages, the operations comprising:

processing an input operation issued from a sockets server application to a sockets layer of the computer, wherein the input operation is configured with a buffer mode parameter indicating to the sockets layer a buffer acquisition method for acquiring a buffer for containing data received from a remote source via a network connection;

receiving the data from the remote source via the network connection;

subsequently, obtaining the buffer according to the buffer acquisition method, wherein the obtained buffer is sized exactly to the size of the data received from the remote source; and allocating the obtained buffer, wherein allocating the obtained buffer is dependent on a value of the buffer mode parameter and comprises one of:

allocating the buffer from an application-supplied storage owned by the sockets server application when the buffer mode parameter has a first value; and allocating the buffer from a system-supplied storage not owned by the sockets server application when the buffer mode parameter has a second value.

2. The non-transitory computer readable storage medium of claim 1, wherein the messages are client-server messages.

3. The non-transitory computer readable storage medium of claim 1, wherein the data is received over a sockets streaming protocol.

4. The non-transitory computer readable storage medium of claim 1, wherein the input operation is further configured with a record definition specifying to the sockets layer a format of the data.

5. The non-transitory computer readable storage medium of claim 2, wherein the allocation is performed by one of the sockets server application and the sockets layer.

6. The non-transitory computer readable storage medium of claim 2, wherein the buffer is allocated from one of:

storage owned by the sockets server application; and system-supplied storage not owned by the sockets server application.

7. The non-transitory computer readable storage medium of claim 2, wherein allocating the buffer comprises executing a callback function provided by the sockets server application with an instruction to allocate the buffer.

8. The non-transitory computer readable storage medium of claim 2, wherein the allocating is performed in response to a buffer request made by the sockets layer.

9. The non-transitory computer readable storage medium of claim 1, further comprising:

if the buffer is large enough to contain the data, copying the data into a previously allocated buffer provided to the sockets layer with the input operation; and if the previously allocated buffer is not large enough to contain the data, requesting a larger buffer sufficient to contain the data in accordance with the buffer acquisition method.

10. A system in a distributed environment, comprising:
- a network interface configured to support a network connection with at least one other computer in the distributed environment;
- a memory comprising a sockets server application, a socket in communication with the sockets server application and a protocol stack in communication with the socket, wherein the protocol stack is configured to transport messages between the network interface and the socket;
- a processor configured to perform operations for processing messages, the operations comprising:
  - processing an input operation issued from the sockets server application to the socket, wherein the input operation is configured with a buffer mode parameter indicating to the socket a buffer acquisition method for acquiring a buffer for containing data received from the at least one other computer; and
  - receiving the data;
  - subsequently, obtaining the buffer according to the buffer acquisition method, wherein the obtained buffer is sized exactly to the size of the data received from the remote source; and
  - allocating the obtained buffer; and
- an application-supplied storage owned by the sockets server application and a system-supplied storage not owned by the sockets server application, and wherein allocating the obtained buffer is dependent on a value of the buffer mode parameter and comprises one of:
  - allocating the buffer from the application-supplied storage when the buffer mode parameter has a first value; and
  - allocating the buffer from the system-supplied storage when the buffer mode parameter has a second value.

11. The system of claim 10, wherein the messages are client-server messages.

12. The system of claim 10, wherein the protocol stack is configured for a sockets streaming protocol.

13. The system of claim 10, wherein the memory comprises record definition specifying to the socket a format of the data.

14. The system of claim 10, wherein the allocation is performed by one of the sockets server application and the socket.

15. The system of claim 10, wherein allocating the buffer comprises executing a callback function provided by the sockets server application with an instruction to allocate the buffer.

16. The system of claim 10, wherein the allocating is performed in response to a buffer request made by the socket.

* * * * *